United States Patent [19]

Endo et al.

[11] Patent Number: 5,801,713
[45] Date of Patent: Sep. 1, 1998

[54] DATA BROWSING APPARATUS AND METHOD THEREFOR INCLUDING AUTOMATIC PAGE-TURNING

[75] Inventors: Kaoru Endo; Mikio Sugiyama, both of Tokyo, Japan

[73] Assignee: NEC Corporation, Tokyo, Japan

[21] Appl. No.: 653,724

[22] Filed: May 23, 1996

[30] Foreign Application Priority Data

May 23, 1995 [JP] Japan .................. 7-146883

[51] Int. Cl.$^6$ .................. G06F 15/00; G06T 1/00
[52] U.S. Cl. .................. 345/473; 345/349; 345/501; 345/901; 345/952; 345/977; 707/501
[58] Field of Search .................. 345/302, 501, 345/473–475, 115, 116, 349, 350, 901, 949–957, 960, 976, 977; 707/104, 500, 501, 517

[56] References Cited

U.S. PATENT DOCUMENTS

| | | | |
|---|---|---|---|
| 5,239,665 | 8/1993 | Tsuchiya | 345/326 |
| 5,283,864 | 2/1994 | Knowlton | 345/350 |
| 5,367,621 | 11/1994 | Cohen et al. | 707/501 |
| 5,428,731 | 6/1995 | Powers, III | 707/501 |
| 5,463,725 | 10/1995 | Henckel et al. | 345/350 |
| 5,513,306 | 4/1996 | Mills et al. | 707/530 |
| 5,524,201 | 6/1996 | Shwarts et al. | 345/326 |
| 5,534,888 | 7/1996 | Lebby et al. | 345/121 |
| 5,659,790 | 8/1997 | Kim et al. | 345/302 |
| 5,696,982 | 12/1997 | Tanigawa et al. | 345/901 |

FOREIGN PATENT DOCUMENTS

| | | |
|---|---|---|
| 0 390 611 A2 | 10/1990 | European Pat. Off. ........ G06F 15/02 |
| 64-72279 | 3/1989 | Japan . |
| 3103984 | 4/1991 | Japan . |
| 4204793 | 7/1992 | Japan . |

OTHER PUBLICATIONS

European Search Report, dated Jun. 5, 1997.
Roy Rosenzweig, "Digitizing the past: a history book on CD-ROM", Information Services & Use Vo. 13, 1993, pp. 35–40.

Primary Examiner—Matthew M. Kim
Assistant Examiner—U. Chauhan
Attorney, Agent, or Firm—McGinn & Gibb, P.C.

[57] ABSTRACT

A data browsing apparatus displays data automatically in an automatic page-turning mode. The data browsing apparatus has dynamic picture display parameters comprising a frame display time (w), a frame display pitch (m), and a display priority (r). The dynamic picture display parameters may be calculated based on automatic page-turning options designated by users. Dynamic pictures are displayed with accuracy at the automatic page-turning interval.

14 Claims, 8 Drawing Sheets

| OPTION | OPERATION | w | m |
|---|---|---|---|
| A1 | NORMAL DISPLAY | (EQ. 3) | 1 |
| A2 | FAST DISPLAY | (EQ. 1) | 1 |
| A3 | SKIPPED FRAMES | (EQ. 3) | (EQ. 2) |
| A4 | OMIT DYNAMIC PICTURE | 0 | 0 |

FIG.3

| OPTION | OPERATION | r |
|--------|-----------|---|
| B1 | STRICT PAGE TURNING INTERVAL | 1 |
| B2 | LAZY PAGE TURNING INTERVAL | 0 |

FIG.4

DATA BROWSING APPARATUS AND METHOD THEREFOR INCLUDING AUTOMATIC PAGE-TURNING

BACKGROUND OF THE INVENTION

The present invention relates to a data browsing apparatus and method, and more particularly to a method and an electronic book for displaying data including dynamic picture information.

Printed materials (e.g., books, newspapers, magazines and the like) include characters, still pictures, and line pictures printed on paper and have been extensively distributed in a readable form. The printed materials (e.g., "hard copy") are very convenient because they can be seen (and handled) directly by the viewer. Moreover, because a large quantity of copies can be printed in a short time period, the printed materials have played an important role as a mass communication means.

On the other hand, the use of paper is costly in terms of the supply of materials, transportation, storage, and disposition after use, because of large weights and volumes required by using paper as "hard copy". Further, although recycling of paper is being practiced as a resource saver, currently it is being reused only as low-quality paper and thus huge wood and timber resources have been consumed to supply high-quality paper for printing.

A data browsing apparatus is utilized to browse data stored in electronic, optical and magnetic recording media other than paper. Various kinds of recording media, such as IC cards (electronically), compact disks (optically), CD-ROMs (optically), floppy disks (magnetically), mini-disks (magneto-optically), magneto-optical disks (magneto-optically), magnetic cards (magnetically), and laser cards (optically), have been utilized as media for recording characters, photographs, and line pictures. Moreover, a portable information display unit (e.g., an electronic book) for reading the information recorded on these recording media is utilized.

In a conventional browsing apparatus, pages are automatically turned at a predetermined interval. Moreover, if a next-page indication key is actuated for more than a predetermined period, pages are turned at a shorter interval.

This conventional browsing apparatus has a problem in that a page-turning scheme is fixed. Therefore, the page-turning scheme cannot be adjusted to users' demands and requirements during automatic page-turning. For example, a user may wish to briefly view dynamic pictures in each page, but does not care whether a page-turning interval is constant. Further, the user may desire the page-turning interval to be constant, but also wants to view all dynamic pictures in each page. Such cases are impossible with the conventional apparatuses.

SUMMARY OF THE INVENTION

In view of the foregoing problem of the conventional apparatus, an object of the present invention is to provide a data browsing apparatus and method for displaying a dynamic picture in an optimum scheme, thereby meeting demands of users during automatic page-turning.

In a data browsing apparatus and method according to a first aspect of the present invention, a data storage stores data divided into pages including frames of a dynamic picture, a display for displaying the data stored in the data storage, and an automatic page-turning unit for turning the pages of the data stored in the data storage according to a designated scheme.

With the unique and unobvious structure and method steps of the present invention, an automatic page-turning scheme is selectable and adjustable depending on the users' demands and requirements.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 3 is a diagram of the correspondence between automatic page-turning options A1–A4 and dynamic picture display parameters: a frame display time (w) and a frame display pitch (m);

FIG. 4 is a diagram of the correspondence between automatic page-turning options B1–B2 and a dynamic picture display parameter: a display priority (r);

DETAILED DESCRIPTION OF THE PREFERRED EMBODIMENT

A data browsing apparatus in accordance with a preferred embodiment of the present invention will be described in detail with reference to the accompanying drawings.

Figure 1:
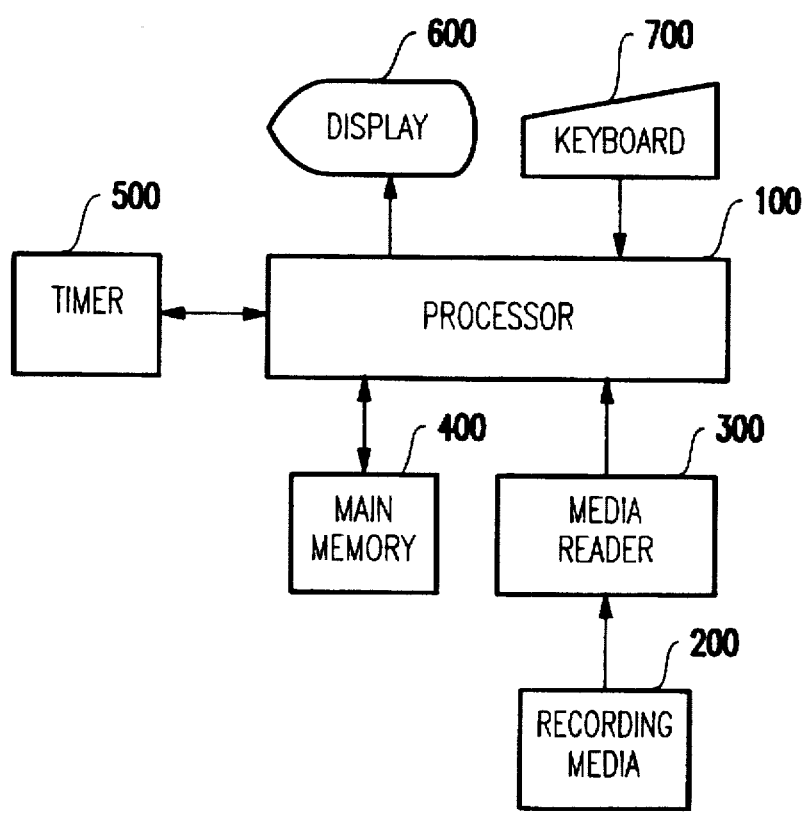
FIG. 1 is a block diagram showing the configuration of a data browsing apparatus according to an embodiment of the present invention.

Referring to FIG. 1, a processor 100 connects together a main memory 400, a keyboard 700, a display 600, a timer 500, and medium (or media) reader 300.

The processor 100 includes an interface circuit (unreferenced) for interfacing with the peripheral units.

The media reader 300 connects to a recording medium 200 (or to a plurality of recording media 200) which stores the data. For example, IC cards, compact disks, CD-ROMs, floppy disks, mini-disks, magneto-optical disks, magnetic cards, and laser cards are used as the recording medium 200. The data in the recording medium 200 comprises at least one of character data, still picture data (e.g., figure, graphic, table, picture, and/or photograph, etc.), dynamic picture data (e.g., animation), and data information for displaying the data.

Animation is a type of dynamic display which appears as a dynamic picture by changing and displaying still pictures one-by-one for a relatively short time period (e.g., less than 1 second). The animation data comprises a number of still pictures (e.g., frames) and frame information for displaying the frames (e.g., a displaying position, a size of a frame, a display speed, a total number of frames, etc.).

The dynamic picture data comprises animation data and dynamic display control codes. The dynamic display control codes indicate functions such as a display and deletion of data, a change of color, movement of a display position, and time waiting. The dynamic display control codes are assigned to codes which are not used as usual data.

For example, a dynamic display control code <Play, nn, x, y, fn, op> indicates a function that "the animation data after this control code is displayed at a position of x and y at a display speed of nn frames per second, the total number of frames is fn, and if op=1, then repeat display, and if op=0, then one-time display". The "repeat display" code represents that, when the display of all frames of an animation is ended, the display returns to the first frame and then the animation is displayed repeatedly.

In another example, a dynamic display control code <Play, dname, x, y, fn, op> indicates a function that "animation data having dname is displayed at a speed of nn frames per second, the total number of frames is fn, and if op=1, then repeat display, and if op=0, then one-time display". In this case, the animation data can be recorded at another position of the recording medium 200 different from other data.

The media reader 300 reads out data recorded on the recording medium 200. For example, an IC card reader, a CD player, a CD-ROM drive, a floppy disk drive, a mini-disk drive, a magneto-optical disk drive, a magnetic card reader, and a laser card reader are used as the media reader 300 in correspondence with the recording medium 200.

The main memory 400 stores a program for displaying data, and has sufficient capacity for this program. The main memory 400 may temporally store a part of data, and may also store a basic program (e.g., a basic input/output system (BIOS) or an operating system (OS)).

The timer 500 operates at a fixed reference clock, and measures an elapsed time. If the timer 500 is activated by the processor 100, then a value of the timer 500 is increased in synchronization with the reference clock. Therefore, if a value of the timer 500 is stored in a memory (e.g., the main memory 400), an elapsed time can be obtained.

The reference clock in the timer 500 is provided with sufficient accuracy by an oscillator (e.g., crystal). In general, the speed of automatic page-turning is about 1 page/sec (display of one page every second) to about 1 page/min (display of one page every minute), a display of a dynamic picture (e.g., animation) is written over once at a speed of 30 frames/sec (display of 30 frames for 1 second) to 1 frame/sec (display of 1 frame for 1 second), and a dynamic display by a dynamic display control code is written over once at a speed of 0.1 second to 10 seconds.

Therefore, in the present invention, if the reference clock on the timer 500 is set to 1 KHz, for example, time can be measured with an accuracy of 1 msec and the reference clock in the timer 500 can be sufficiently used for the present invention.

The display 600 displays the data read out of the recording medium 200. The display 600 comprises one of a cathode ray tube (CRT) display, a liquid crystal display device, and a light-emitting diode (LED).

The keyboard 700 is an input device having keys for instructing, for example, a power ON/OFF of a power supply, turning to a next page and a previous page, and display of a menu. Input devices other than the keyboard 700 can be suitably adapted to the system. For example, a track ball, joy stick, touch panel, light pointer, and the like can be easily tailored for use with the inventive structure.

Hereinbelow and referring to FIGS. 2–8, the operation of the data browsing apparatus in accordance with the above-mentioned embodiment of the present invention will be described.

The data browsing apparatus has two modes (e.g., a normal mode and an automatic page-turning mode). In the normal mode, each page is displayed according to directions provided by the user for each page. In the automatic page-turning mode, each page is displayed automatically one-by-one without further input or instruction by the user after the initial instruction.

A page-turning interval T represents an interval of the automatic page-turning in the automatic page-turning mode. For example, T=10 represents that one page is turned over at intervals of 10 seconds. The page-turning interval T does not have an effective interval (e.g., "0") in the normal mode.

In the normal mode, the data browsing apparatus is in an idle status until a code (e.g., any code) is input by the user through the keyboard 700 (steps S1 and S2). If any code is input by the input device (e.g., the keyboard 700), the processor 100 decodes the code to determine a key type (step S3).

If the code indicates a "page forward" (e.g., turning to a next page), a page counter P stored in a predetermined position of the main memory 400 will be incremented by "1" (step S7). Thereafter, the display 600 displays one-page data pointed to by the page counter P (step S9).

If the code indicates a "page backward" (e.g., turning to a previous page), the page counter stored in the predetermined position of the main memory 400 will be decremented by 1 (step SG). Thereafter, the display 600 displays one-page data pointed by the page counter P (step S9).

If the code indicates a "setting of mode", the processor 100 sets the dynamic picture display parameters (step S8). The setting of the dynamic picture displaying parameters is described later.

If the code indicates an "end processing", a termination ("shutdown") process will be performed (step S4) to turn off the power supply. The end processing includes data save operations (e.g., a page position that has been read). Thus, when the power supply is next turned on, the page which was being read can be displayed immediately, or the contents which were being set or processed can be restored. A memory saving the data may be one of the main memory 400 and the recording medium 200.

If the code indicates functions other than steps S4, S6, S7, and S8, these steps will be independently processed (step S5). Exemplary other functions include setting a mark to data (e.g., character, figure, table and the like), setting marks to pages, cutting out part of the data, enlarging or reducing the display, searching, and jumping to a specified page (e.g., page "3", contents, cover and the like).

If none of the codes is input by the keyboard 700 (as determined in steps S1 and S2), the apparatus is in the automatic page-turning mode, and the timer 500 starts counting (step S10). Then, the page counter is incremented by 1 (step S11), and the display 600 displays a one-page data (step S12). The display scheme in step S12 is described below.

After the display of a one-page data, in step S13 it is checked whether the page-turning interval T (e.g., 10 seconds) has elapsed after the starting of the timer 500 in step S10. If the page-turning interval T has not elapsed, the data browsing apparatus remains displaying the one-page data until the interval T elapses.

Until the automatic page-turning mode is released, the above-described steps S1, S2, and S10 to S13 are repeated to realize the automatic page-turning.

Next, the dynamic picture display parameters in the automatic page-turning mode are described. The dynamic picture display parameters include a frame display time (w), a frame display pitch (m), and a display priority (r).

The frame display time represents the time to display one frame data. For example, in the case of w=0.1, one frame is displayed for 0.1 second. Thus, 10 frames are displayed in 1 second.

The frame display pitch m represents a pitch of the frames to be displayed for animation data. For example, when m=1 every frame of animation data is displayed, when m=2 every other frame of animation data is displayed, and when m=3 every third frame of animation data is displayed.

The display priority represents whether a display of a dynamic picture is immediately stopped (e.g., r=1) or not (e.g., r=0), when the page-turning interval T has elapsed.

The dynamic picture display parameters may be set individually, or may be calculated according to automatic page-turning options discussed below.

Referring to FIGS. 3 and 4, the automatic page-turning options include options A1–A4 and B1–B2. One of options A1–A4 and one of options B1–B2 are selected by the keyboard 700.

The option A1 represents a normal display. Thus, all data in the page is displayed for the page-turning interval T.

The option A2 represents a fast (e.g., high-speed) display. The display time for each frame of animation data in dynamic pictures is reduced, with this option.

The option A3 represents a display with skipped frames. At least one frame of animation data in dynamic pictures is skipped (e.g., dropped), with this option.

The option A4 represents a display without displaying any animation data in dynamic pictures. No dynamic pictures (e.g., animation data) in the page are displayed with this option.

The option B1 represents a "strict" page-turning interval. The page display is interruptable after the page-turning interval T has elapsed, with this option.

The option B2 represents a "lazy" page-turning interval. The page display is not interruptable even after the page-turning interval T has elapsed, with this option.

The dynamic picture display parameters are set according to FIGS. 3 and 4. In the options A1 and A2, the frame display pitch (m) is set to "1", because frames are not dropped in these options. In the option A4, both the frame display time (w) and the frame display pitch (m) are set to "0", because no animation data is displayed in this option. In the option B1, the display priority (r) is set to "1", because the page-turning interval is strict in this option. In the option B2, the display priority (r) is set to "0", because the page-turning interval is not strict in this option.

In the option A2, the frame display time (w) is set according to the following Equation 1.

$$w=(T-CC-CH-ST)/FR \quad (1)$$

Here, CC represents a total display time of a display of a display control code, CH represents a total display time of character data, ST represents a total display time of still picture data, and FR represents a total number of frames of an animation.

Since "(T−CC−CH−ST)" in the Equation 1 corresponds to a display time for animation data in one page, the frame display time (w) shows an average time for displaying one frame.

In the option A3, the frame display pitch (m) is set according to a following Equation 2.

$$m=INT(FR(T-CC-CH-ST)/SP) \quad (2)$$

Here, SP represents an average animation display speed (e.g., frames per second), and INT(A) represents a function of truncating A to a minimum integer larger than A.

Since "FR/(T−CC−CH−ST)" corresponds to an ideal speed to display all frames in the predetermined time, the frame display pitch is obtained by dividing the ideal speed by "SP". Thus, the entire data in one page can be displayed within the page-turning interval T.

In the options A1 and A3, the frame display time (w) is set according to a following Equation 3.

$$w=1/SP \quad (3)$$

Figure 2:
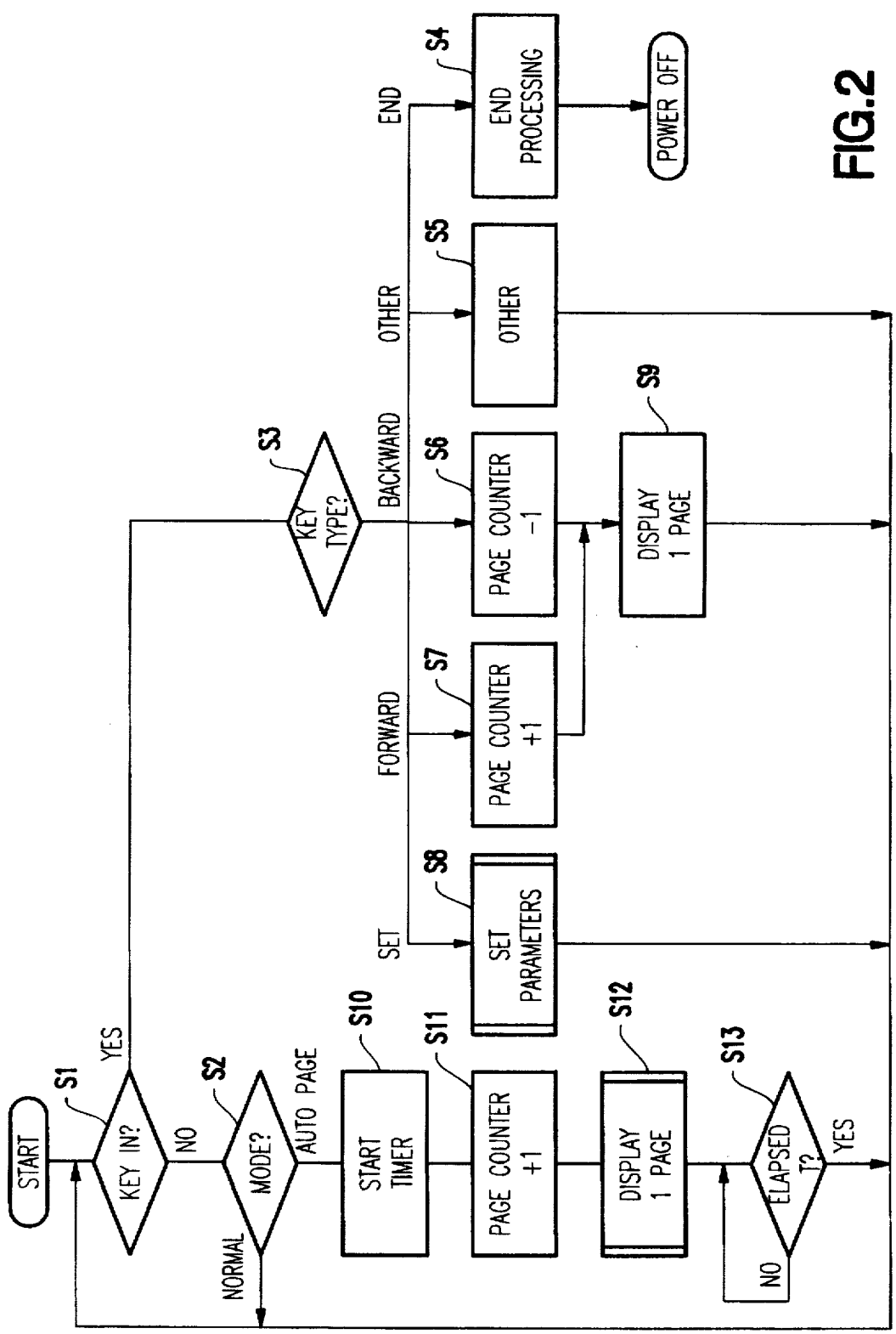
FIG. 2 is a flowchart showing the operation of the present invention.

Next, the operation of setting the parameters in step S8 of FIG. 2 is described.

Figure 5:
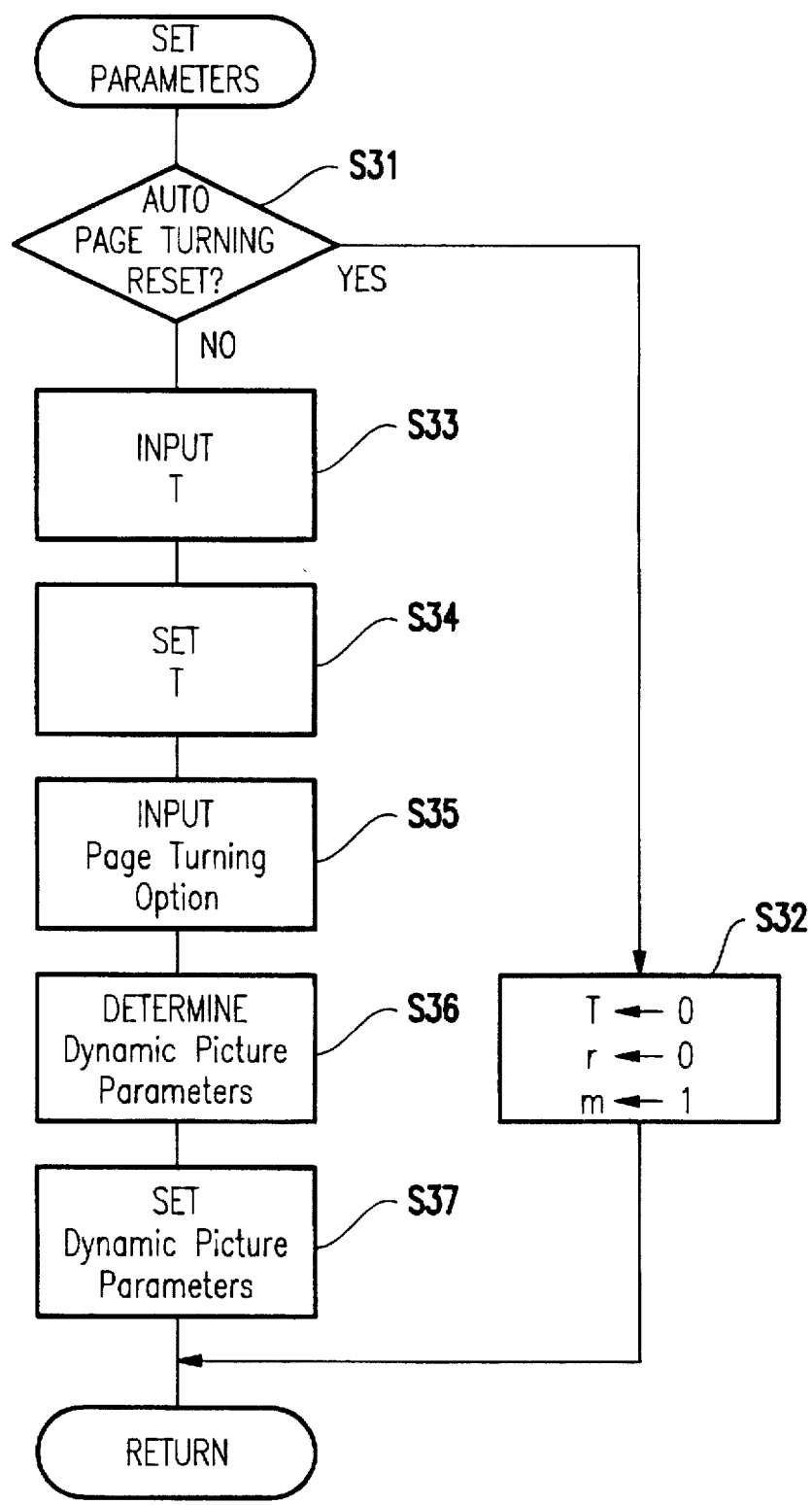
FIG. 5 is a flowchart showing setting of the automatic page-turning parameters (S8 in FIG. 2)

Referring to FIG. 5, it is judged whether a demand (e.g., instruction) from the keyboard 700 is an automatic page-turning mode reset instruction (step S31). For an automatic page-turning mode reset, the page-turning interval T is set to "0" and the dynamic picture display parameters, r and m, are set to "0" and "1", respectively (step S32).

If the demand from the keyboard 700 is for the setting of the automatic page-turning mode instruction, the value to be set as the page-turning interval T is input from the keyboard 700 (step S33). The value may be input by directly inputting a numerical value from the keyboard 700, or by selecting a suitable value among previously-prepared values. The input value is set as the page-turning interval T (step S34).

Thereafter, the automatic page-turning options are designated by the keyboard 700 (step S35). As mentioned above, the dynamic picture display parameters are determined according to FIGS. 3 and 4 based on the automatic page-turning options (step S36). However, the dynamic picture display parameters can be designated directly by the keyboard 700. Regardless, one of the calculated values and designated values is set as the dynamic picture display parameters (step S37). The automatic page-turning options and the dynamic picture display parameters may be saved in the main memory 400.

Next, the operation of displaying one-page data in step S12 of FIG. 2 is described.

Figure 6:
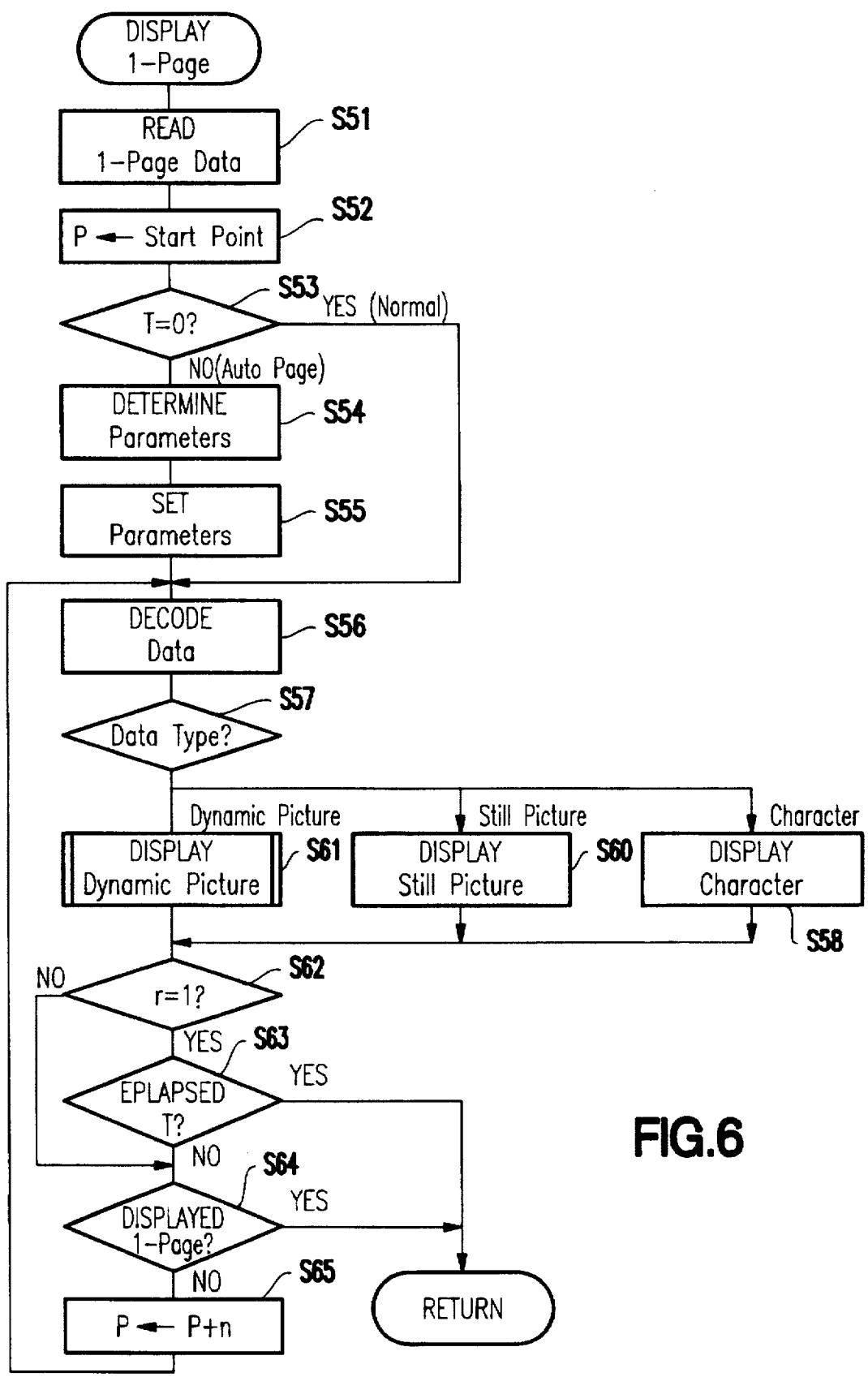
FIG. 6 is a flowchart showing the operation of displaying data of one page (S12 in FIG. 2)

Referring to FIG. 6, the data of a page to be displayed are read from the recording medium (or media) 200 by the media reader 300 (step S51). The data may be written in the main memory 400. A starting address of the data in the main memory 400 is set to a pointer P (step S52). A plurality of pages of the data may have been previously written in the main memory 400.

In step S53, it is judged whether T=0. If T≠0, then the apparatus is in the automatic page-turning mode and therefore the dynamic picture display parameters, w and m, are calculated (step S54).

In step S54, if the automatic page-turning option is neither A2 nor A3, then the calculation and setting of the dynamic picture display parameters w and m are not performed because both w and m have been set in the aforementioned steps S36 and S37 of FIG. 5.

In step S54, if the automatic page-turning option is A2 (e.g., the "fast" display), a value of w is calculated by using the aforementioned Equation 1 and m is set to "1". At this time, the total display time of the display of the display control code and the total number of frames of an animation may be obtained by analyzing all data of one page, or may be calculated in advance when data of one page are generated (e.g., editing) and recorded on a predetermined position of data of one page.

In step S54, if the automatic page-turning option is A3 (e.g., the "skipped" frame option), a value of m is calculated by using the aforementioned Equation 2.

The dynamic picture display parameters w and m thus calculated are stored in predetermined positions of the main memory 400 (step S55).

After the setting of the parameters, data pointed by the pointer P is decoded (step S56). In step S57, the data type is determined. The decoded data is displayed in the display 600 depending on the type of data (as determined in step S57) such as a display of character data (step S58), still picture data (step S60), and dynamic picture data (step S61).

After the respective data are displayed, it is checked whether r=1 (step S62). If r=1, then the page-turning interval T has priority, and thus it is checked whether the page-turning interval T has elapsed after the display of this page is started in step S10 of FIG. 2. If the page-turning interval T has elapsed, a process of displaying data of one page will be interrupted (step S63). When data still remains to be displayed (step S64), the quantity of the data that was displayed (e.g., n) is added to the pointer P (step S65), and the process from step S56 is repeated.

Next, the operation of displaying a dynamic picture in step S61 of FIG. 6 is described.

Figure 7:
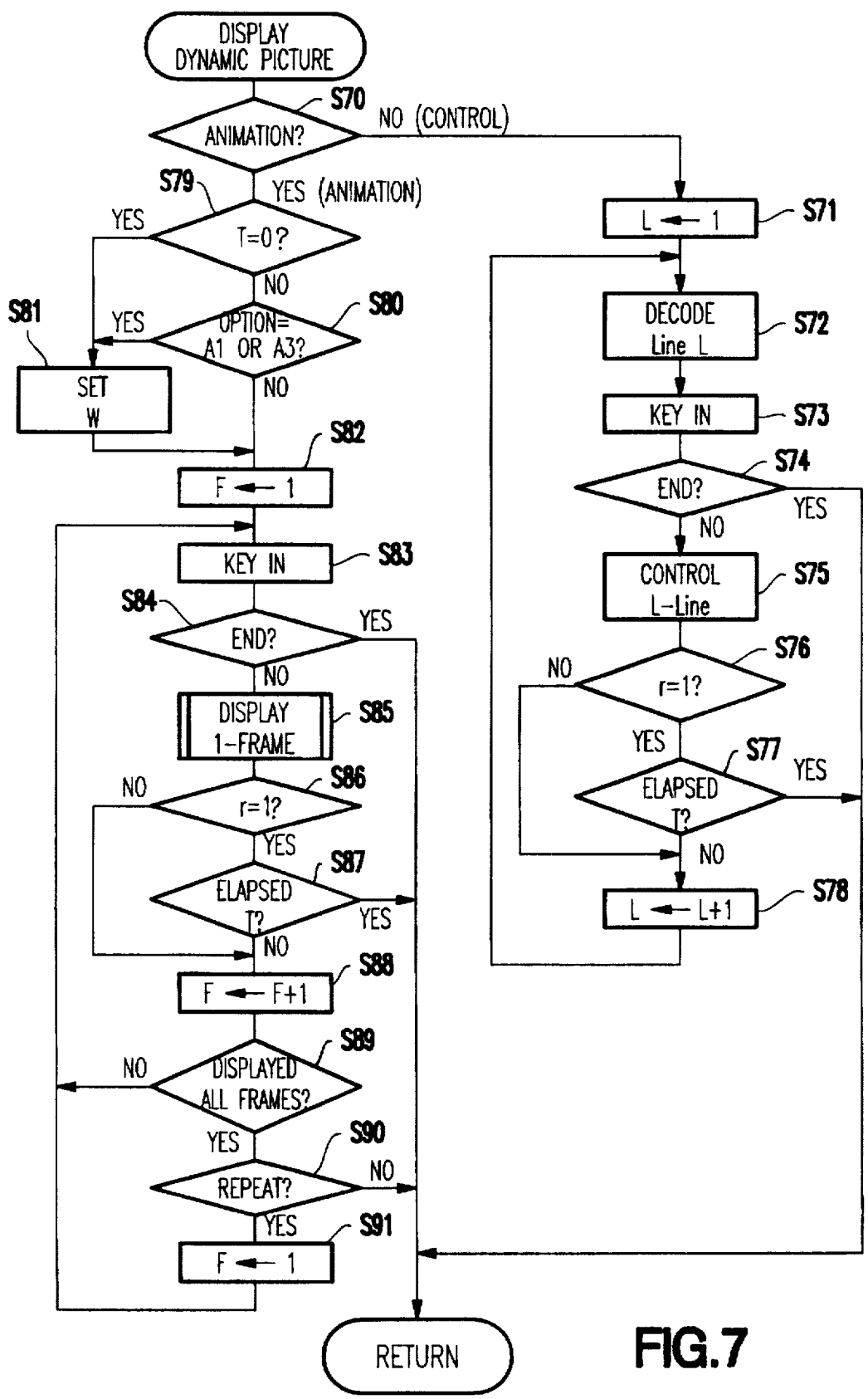
FIG. 7 is a flowchart showing the operation of displaying dynamic picture data (S61 in FIG. 6)

Referring to FIG. 7, it is checked whether the data pointed to by the pointer P is animation data (step S70). If the data is not animation data, then a line counter L will be set to "1" (step S71) and the L-th line data is decoded (step S72).

Then, a demand (instruction) is received from the keyboard 700 (step S73), and the demand is checked to judge whether the demand represents an end of the display (step S74). If the demand represents the end of the display, the display will be stopped immediately.

If the demand does not represent the end of the display, a dynamic display control will be performed based on the L-th line data (step S75). At this time, if the automatic page-turning option is either A2 or A3, a dynamic control code in which displaying does not complete during the automatic page-turning interval T (e.g., time waiting, input waiting, repeating display and the like) is neglected.

If the dynamic control display is ended by one line, it will be checked whether r=1 (step S76). If r=1, the page-turning interval T has priority, and in step S77 it is judged whether the page-turning interval T has elapsed after the display of this page is started in step S10 of FIG. 2. If the interval T has elapsed, then the process returns and the displaying process of the dynamic picture data will be interrupted. If the interval T has not elapsed as determined in step S77, the line counter L is incremented by 1 in order to perform the dynamic control display of the next line (step S78), and the process from step S72 is repeated.

On the other hand, in step 70, if the pointed data is judged to be animation data (as opposed to control data), then it is checked whether T=0 (step S79). If T≠0, then it is checked whether the automatic page-turning option is either A1 or A3 (step S80). As a result, if either T=0 (as judged in step S79) or the automatic page-turning option is either A1 or A3 (as judged in step S80), the dynamic picture display parameter, w, is calculated according to Equation 3 and set (step S81).

Thereafter, a frame counter F is set to "1" (step S82). A demand is input from the keyboard 700 (step S83), and it is checked whether the demand represents an end of the display (step S84). If the demand represents the end of the display, then the display will be stopped immediately. If the demand does not represent the end of the display, one frame of animation data will be displayed (step S85).

After displaying the one frame, it is checked whether the dynamic picture display parameter r equals "1" (step S86). If r=1, then the page-turning interval T has priority, and in step S87 it is judged whether the page-turning interval T has elapsed after the display of this page is started in step S10 of FIG. 2. If the interval T has elapsed, then the displaying process of the dynamic picture data will be interrupted immediately. If the interval T has not elapsed, then the frame counter F is incremented by 1 in order to perform the display of the next frame (step S88).

Then, it is checked whether all frames have been displayed (step S89). If the display has not been completed, then the operation will be repeated from step S83. If the display has been completed as judged in step S89, it is checked whether the dynamic display control code indicates whether the display should be repeated (step S90). If the display is not to be repeated, the display of the dynamic picture data is ended. In the case of repeating the display, the frame counter is set to "1" (step S91), and the operation returns to step S83.

Next, the operation of displaying one frame data in step S85 of FIG. 7 is described.

Figure 8:
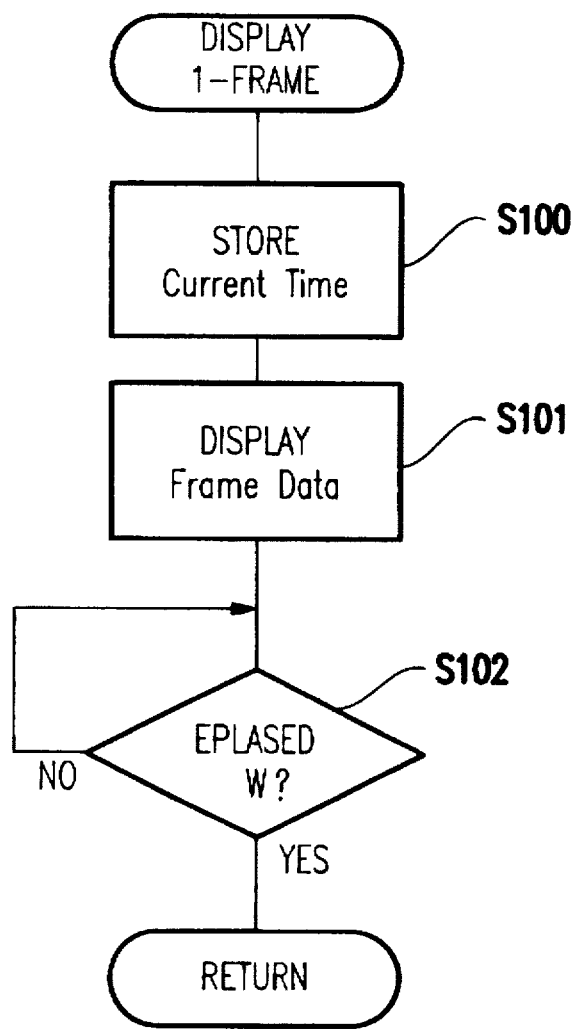
FIG. 8 is a flowchart showing the operation of displaying one frame (S85 in FIG. 7).

Referring to FIG. 8, in step S100, the current value of the timer 500 is stored in a temporary area (e.g., the main memory 400). After one frame of data has been displayed on the display 600 (step S101), a difference between the timer value stored in step S100 and the current timer value is calculated. The display of one frame remains until the difference is equal to or greater than the frame display time w (step 102). Therefore, each frame of the animation data is controlled to be displayed for the frame display time w.

As is apparent from the above description, the present invention achieves numerous advantages.

First, dynamic pictures are displayed with accuracy at the automatic page-turning interval, because the dynamic picture display parameters are selectively changeable in correspondence with the automatic page-turning interval.

Second, the automatic page-turning scheme is selectable depending on the user's demands and requirements, because the automatic page-turning options or the dynamic picture display parameters can be designated by the user.

While the invention has been described in terms of a preferred embodiment, those skilled in the art will recognize that the invention can be practiced with modification within the spirit and scope of the appended claims.

What is claimed is:

1. A data browsing apparatus comprising:

a medium for storing data divided into pages including frames of a dynamic picture;

a medium reader for reading the data from said medium;

a display for displaying the data read by said medium reader;

a parameter memory for storing a parameter of displaying the dynamic picture; and an automatic page-turning unit for turning the pages of the data read by said medium reader according to the parameter stored in said parameter memory and selectively adjustable by a user.

2. The data browsing apparatus according to claim 1, said parameter comprising a time for displaying each one of the frames.

3. The data browsing apparatus according to claim 1, said parameter comprising a pitch of the frame for skipping frames.

4. The data browsing apparatus according to claim 1, further comprising:

a timer for counting an interval of displaying each one of the pages of the data.

5. The data browsing apparatus according to claim 4, said parameter comprising a priority of the interval counted by said timer.

6. The data browsing apparatus according to claim 1, said automatic page-turning unit including:

a parameter determinator for determining the parameter to be stored in said parameter memory according to a designated option.

7. The data browsing apparatus according to claim 6, said designated option comprising a first display option for displaying the dynamic picture so as to complete all frames in the page-turning interval.

8. The data browsing apparatus according to claim 6, said designated option comprising a second option for displaying the dynamic picture with at least one frame of the dynamic picture being skipped.

9. The data browsing apparatus according to claim 6, said designated option comprising a third option for displaying a page without displaying said dynamic picture.

10. A data browsing apparatus, comprising:

a data storage for storing data divided into pages including frames of a dynamic picture;

a display for displaying the data stored in said data storage; and an automatic page-turning unit for turning the pages of the data stored in said data storage according to a designated scheme selectively adjustable by a user, wherein said automatic page-turning unit includes means for designating said scheme, said designated scheme including a display scheme for displaying the frames of the dynamic picture, said designating means including means for selectively adjusting a pitch of the frames for skipping frames.

11. A data browsing apparatus, comprising:

a data storage for storing data divided into pages including frames of a dynamic picture;

a display for displaying the data stored in said data storage; and an automatic page-turning unit for turning the pages of the data stored in said data storage according to a designated scheme selectively adjustable by a user, wherein said automatic page-turning unit includes means for designating said scheme, said designated scheme including a display scheme for displaying the frames of the dynamic picture, said designating means including means for selectively interrupting the dynamic picture.

12. A method of turning pages of data including frames of a dynamic picture, said method comprising steps of:

setting a parameter of displaying the dynamic picture;

starting a timer for counting a display interval of displaying each one of the pages of the data; and displaying one page of the data, until the timer completes counting said display interval to a predetermined interval, said step of setting a parameter comprising setting a pitch of the frame for skipping frames.

13. A method of turning pages of data including frames of a dynamic picture, said method comprising steps of:

setting a parameter of displaying the dynamic picture;

starting a timer for counting a display interval of displaying each one of the pages of the data; and displaying one page of the data, until the timer completes counting said display interval to a predetermined interval, said step of setting a parameter comprising setting a priority of the display interval counted by the timer.

14. The method of turning pages of the data according to claim 13, said displaying step including a step of:

interrupting a display of said one page after the timer completes counting said predetermined interval if the priority of the display interval is higher than said interval of displaying said one page.

* * * * *